United States Patent [19]

Davenport

[11] Patent Number: 5,330,081
[45] Date of Patent: Jul. 19, 1994

[54] MEASURING DOSAGE DISPENSER

[75] Inventor: Robert A. Davenport, Sylvania, Ohio

[73] Assignee: Impact Products, Inc., Toledo, Ohio

[21] Appl. No.: 44,632

[22] Filed: Apr. 8, 1993

[51] Int. Cl.⁵ .................... B65D 37/00; B67D 5/06
[52] U.S. Cl. .................................. 222/207; 222/211
[58] Field of Search ............... 222/207, 209, 211, 548, 222/570

[56] References Cited

U.S. PATENT DOCUMENTS

| | | |
|---|---|---|
| 3,190,505 | 6/1965 | Arbitman et al. .................... 222/207 |
| 3,921,860 | 11/1975 | Zackheim .............................. 222/207 |
| 4,474,312 | 10/1984 | Donoghue ........................... 222/207 X |
| 4,607,762 | 8/1986 | Zulauf et al. ....................... 222/207 X |
| 4,660,746 | 4/1987 | Wright ................................. 222/207 |
| 4,747,521 | 5/1988 | Saffron ............................... 222/207 X |
| 4,905,819 | 3/1990 | Clements et al. ................. 222/207 X |
| 4,971,226 | 11/1990 | Donoghue ............................ 222/207 |
| 5,120,148 | 6/1992 | Waters et al. ..................... 222/207 X |
| 5,224,632 | 7/1993 | Murakami et al. .............. 222/207 X |

FOREIGN PATENT DOCUMENTS

| | | | |
|---|---|---|---|
| 0331589 | 9/1989 | European Pat. Off. ............ 222/207 |
| 2009926 | 10/1971 | Fed. Rep. of Germany ...... 222/207 |
| 2637366 | 4/1990 | France ................................. 222/207 |
| 7712828 | 5/1979 | Netherlands ........................ 222/207 |
| 2067517 | 7/1981 | United Kingdom ................ 222/207 |

Primary Examiner—Andres Kashnikow
Assistant Examiner—Kenneth DeRosa
Attorney, Agent, or Firm—Marshall & Melhorn

[57] ABSTRACT

A portion measuring device of the type having a first, flexible, reservoir having an inlet, and a second, portion measuring, reservoir in fluid communication with said first reservoir. The first, flexible, reservoir is of a larger volume than that heretofore known, and may have a handle to aid in holding. The second, portion measuring, reservoir has a rotatable closure with a pouring spout or opening therein. A configured periphery is provided on the closure to aid in turning the same.

4 Claims, 1 Drawing Sheet

U.S. Patent  July 19, 1994  5,330,081
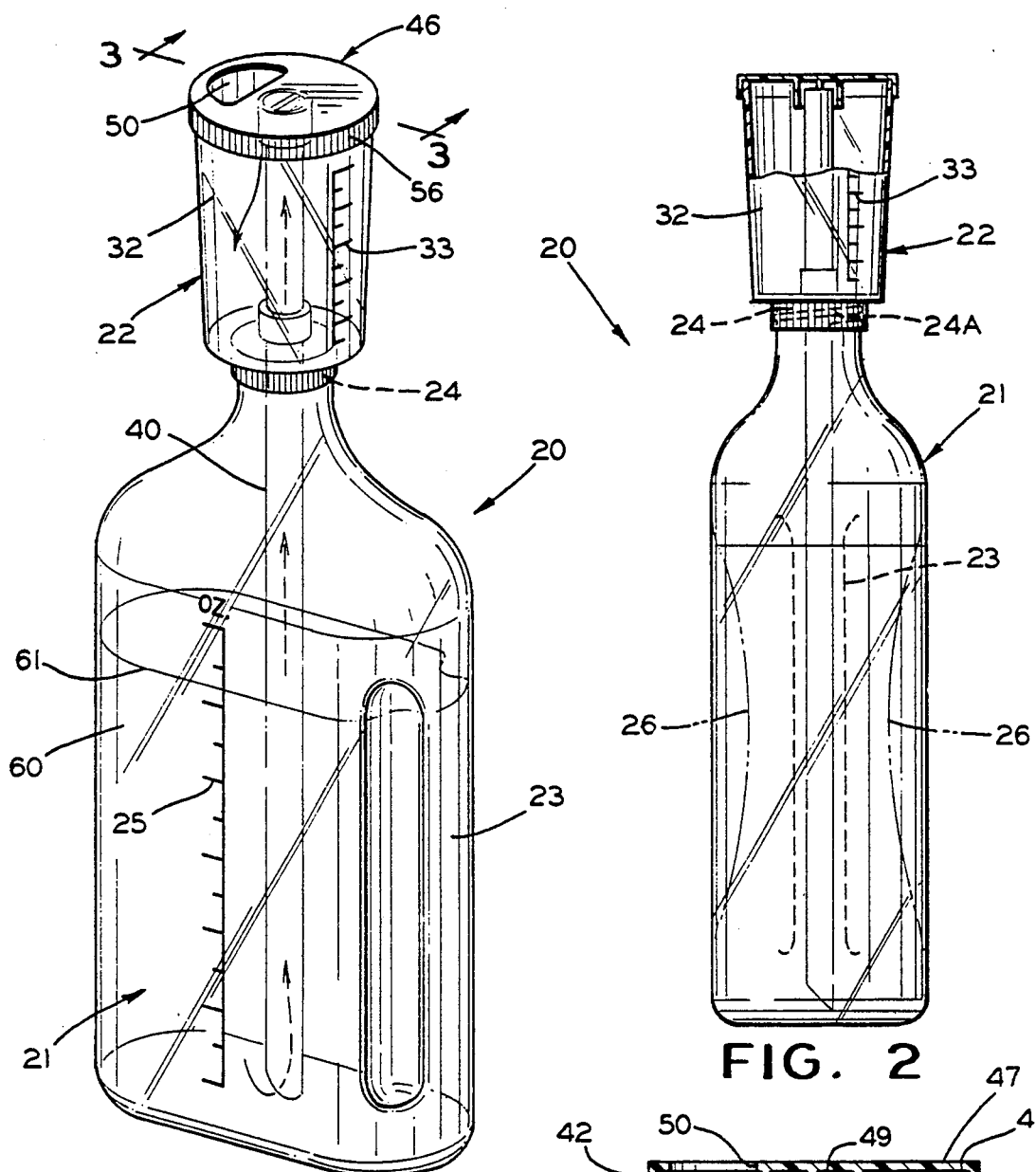
FIG. 1
FIG. 2
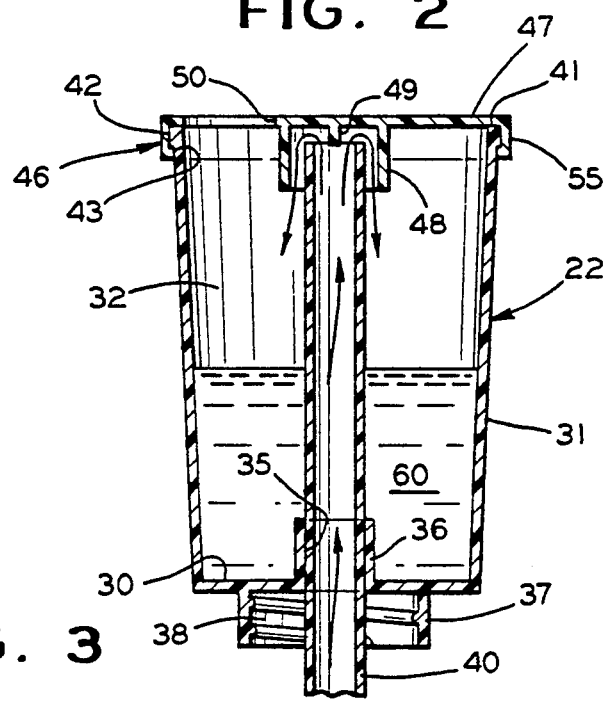
FIG. 3

MEASURING DOSAGE DISPENSER

BACKGROUND OF THE INVENTION

1. Field of the Invention

The present invention relates to a portion measuring device for fluids. More particularly, the present invention relates to a portion measuring device of a known type having a first reservoir in fluid communication with a second reservoir having indicia thereon indicating, for example, ounces and milliliters.

2. Description of the Prior Art

Portion measuring devices of the type having a first, flexible, reservoir and a second, portion measuring, reservoir are generally known. The first reservoir is generally made of a flexible material, such as a high density polyethylene, and has indications thereon of ounces, milliliters and dilution measurements. The second reservoir is generally cylindrical in nature, and made of a rigid material.

Portion measuring devices are commonly used to produce mixtures of liquids. A cleaning solution may require three ounces of a solution to be mixed with a gallon of water. The outer flexible walls of a first reservoir of a known portion measuring device containing a solution are caused to be squeezed together. The cleaning solution therein is forced upwardly of a tube, through an inlet, into a second reservoir. The second reservoir is closed by a cap. When the liquid forced up through the tube contacts the cap or closure means, it is directed downwardly into the generally cup-shaped second reservoir to the extent desired by the user, for example, three ounces. The entire device is then rotated until the pouring opening in the cap is in a convenient pouring position, and the three ounces of solution is poured into the gallon of water.

Problems have developed in the use of these known portion measuring devices. The first reservoirs had to be small enough to place in the palm of the hand of the user, and thus, have been limited in size. Any attempt to increase the size of the first reservoir has made that portion heavy and extremely fatiguing in use. The constant need to rotate the entire device to align the pouring opening has also been extremely inconvenient. Thus, those in the field of portion measuring devices have continued searching for a larger, yet convenient, measuring device.

SUMMARY OF THE INVENTION

To largely eliminate the problems present in the prior art, there is provided a first reservoir of a portion measuring device which is flexible and capable of holding a large volume, such as one gallon or more of solution. A handle is provided on the first reservoir to relieve operator fatigue.

Since the most convenient means of pouring the solution forced into the second reservoir will be in a direction generally opposite the handle, the known closure means is replaced with a rotatable closure means having a pouring spout or opening provided therein, and a roughened, knurled, or formed outer periphery to aid in turning the pouring spout to a position diametrically opposed to the handle.

Thus, one of the objects of the present invention is to provide a portion measuring device having a larger capacity than that heretofore known.

A further object of the present invention is to provide a portion measuring device of the foregoing nature having a handle or other carrying means to relieve user fatigue.

A still further object of the present invention is to provide a portion measuring device of the foregoing nature having a rotatable closure means, which is positionable in a position diametrically opposed to the handle, for convenience in pouring.

A still further object of the present invention is to provide a closure means which has a configured outer periphery to facilitate the rotation thereof.

A further object of the present invention is to provide a pouring aid of large capacity which is simple to use, and relatively inexpensive to manufacture.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a perspective view of a measuring device embodying the present invention.

FIG. 2 is an elevational view of the measuring device shown in FIG. 1.

FIG. 3 is a partial sectional view, taken in the direction of the arrows, along the section line 3—3 of FIG. 1.

It is to be understood that the present invention is not limited to the details of construction and arrangement of parts illustrated in the accompanying drawings, since the invention is capable of other embodiments, and of being practiced in various ways within the scope of the appended claims. Also, it is to be understood that the phraseology and terminology employed herein is for the purpose of description, and not of limitation.

DESCRIPTION OF THE PREFERRED EMBODIMENTS

Referring now to FIG. 1, there is shown a portion measuring aid embodying the present invention, and generally indicated by the numeral 20. The portion measuring aid 20 consists of a first, flexible, reservoir 21, and a second, portion measuring, reservoir 22. The first reservoir 21 of the portion measuring aid 20, may be constructed of any suitable flexible translucent material such as high density polyethylene. The first portion 21 has a handle 23 for the convenience of the user, together with an inlet 24.

Any desired indicia 25 indicating the volume in the first reservoir 21 may be placed thereon, such as the ounces, for example. It should be understood that the indicia 25 may contain multiple indicia, such as ounces, milliliters and dilution measures. The indicia 25 may vary depending on the application of the portion measuring aid 20.

As shown by the dotted lines indicated at 26, the walls of the first reservoir 21 are flexible, and pressure on the outside thereof will cause the walls of the first reservoir 21 to move inwardly, as indicated at 26.

The inlet 24 of the first reservoir 21 may have provided thereon male threads 24A for connection to the second reservoir 22.

The second reservoir 22 is shown in more detail in FIG. 3. The second, portion measuring, reservoir 22 of the portion measuring aid 20 is generally cup-like in shape. A bottom wall 30, usually of circular shape, in combination with an upwardly extending circumferential sidewall 31, encloses the bottom wall to form a cup-shaped reservoir 32. Indicia 33 may be indicated thereon. The cup-shaped reservoir 32 includes an inlet 35 having a concentric, upwardly extending lip portion 36.

The cup-shaped reservoir 32 also has a concentric downwardly depending sidewall 37 having a female threaded portion on the inside thereof. These threads form the female threaded connecting portion 38 of the second reservoir 22. It can readily be understood that if the threaded female connecting portion 38 is twisted onto the male threads 24A, a tight connection is made between the first reservoir 21 and the second reservoir 22.

A tube 40 is provided in the inlet 35 of the second reservoir 22. The tube 40 extends from near the top or rim 41 of the upstanding circumferential sidewall 31 to near or at the bottom of the first reservoir 21, thus placing the first reservoir portion 21 in fluid communication with the second reservoir 22.

The closure member 46 has a top wall 47, an outer, downwardly depending side wall 55, and an inner, downwardly depending, sidewall 48 in axial alignment and concentric with the inlet 35 of the second reservoir 22. The diameter of the downwardly depending sidewall 48 is slightly larger than the tube 40. This arrangement provides some space between the top of the tube 40 and the downwardly depending concentric sidewall 48.

A diametric ridge 49 is provided at the diameter of the downwardly depending sidewall 48 to keep the top of the tube 40 from contacting the top wall 47. The diameter of the concentric upwardly depending lip portion 36 of the inlet 35 is substantially the same size as the inlet 35 so that there is some friction, and therefore sealing between the tube 40 and the inlet 35.

It can be seen that when the operator applies pressure to the sidewalls of the first reservoir 21, the sidewalls thereof will flex, as indicated by the numeral 26, and fluid will be caused to travel up the tube 40, impact against the closure member 46, travel down the space between the tube 40, and the downwardly depending sidewall 48, and commence the filling of the cup-shaped reservoir 32. The operator will continue to apply pressure to the sidewalls of the first, flexible, reservoir 21 until the desired amount of liquid is in the cup-shaped reservoir 32. A pouring spout or opening 50 is provided so that the user of the portion measuring aid 20 may pour the fluid out of the cup-shaped reservoir 32.

Because of the larger size reservoirs usable with the present invention, it becomes important to easily be able to turn the closure member 46 in a desired direction to align the opening 50 with the receptacle which is to receive the liquid contained in the second reservoir 22. It can be readily understood that it will be easier to turn the closure member 46, than it would be to turn the heavy, liquid filled, measuring device 20. Normally, but not always, it will be most convenient if the operator pours in a direction opposite the handle 23.

To facilitate turning the closure member, the outer periphery of the outer, concentric, downwardly depending sidewall 55 is formed to facilitate gripping and turning by the operator. The outer exposed surface of the sidewall 55 may be knurled or embossed, as generally indicated at 56. Alternately, the exposed surface 56 may have ridges, scallops or other desired shapes (not shown) formed therein.

To assure that the closure member 46 may be rotated relative to the second reservoir 22, and at the same time firmly but removably attached to the second reservoir 22, there is provided a radially inwardly extending ridge 43 provided on the inside of the outer, concentric, downwardly depending sidewall portion 55 of the closure member 46. Since the material of the closure member 46 is flexible, the closure member 46 may be readily secured to the reservoir 32 by placing it over the rim 41 and applying a downward pressure. The downwardly depending wall 55 will deform slightly, allowing the inwardly radially extending ridge 43 to pass over the downwardly, and radially extending retaining wall portion 42 of the upstanding circumferential sidewall 31, and then "snap" back to its original position, firmly retaining the cap or closure member 46 on the second reservoir 22.

Referring to FIG. 1, the liquid or fluid 60 in the first reservoir 21 is shown at a level indicated by the numeral 61. Pressure on the sidewalls of the first reservoir 21, as indicated in dotted lines in FIG. 2, will cause the liquid 60 to travel upward through the tube 40, impinge on the bottom wall of the closure member 46, and guided downwardly by the concentric downwardly depending sidewall 48 into the cup-shaped reservoir 32. When the liquid reaches the desired level, as indicated by the indicia 33, the operator will release the pressure on the sidewalls of first reservoir 21, and twist the closure member 46 until the opening 50 is in the desired position. The operator then simply grasps the handle 23, and tilts the first reservoir 21, until the liquid exits the second reservoir 22 through the opening 50.

Careful study of the present day portion measuring devices, and the problems therewith, has produced a new and improved portion measuring aid.

What is claimed is:

1. A measuring device including:
a) a first flexible reservoir portion including a central circular inlet having a male threaded connector portion;
b) a second portion measuring reservoir portion including a circular bottom wall, an upwardly extending circumferential side wall enclosing the bottom to form a cup-shaped reservoir and terminating in a radially and axially extending retaining wall portion, an inlet having a concentric upwardly extending lip portion, and a concentric downwardly depending wall having a threaded female connecting portion for attachment to the male threaded connector portion of said first reservoir portion;
c) a tube in fluid communication between said first reservoir portion and the inlet of said second reservoir portion; and
d) a closure for said second reservoir portion including a concentric downwardly depending lip in axial alignment with the inlet of said second reservoir portion to receive an end of said tube, a diametric ridge provided within the downwardly depending lip to space the end of said tube from said closure to provide fluid flow between said tube and the downwardly depending lip, and an outer downwardly depending side wall having a radially inwardly extending in mating engagement with the retaining wall of said second reservoir portion for retaining said closure on said second reservoir portion.

2. The device defined in claim 1 including an opening in said closure to permit pouring of liquid from said second reservoir portion.

3. The device defined in claim 2 wherein the periphery of the outer downwardly depending side wall of said closure is configured to facilitate gripping and turning thereof.

4. The device defined in claim 3 wherein said first flexible reservoir portion includes a handle.

* * * * *